United States Patent [19]

Carmichael

[11] 4,078,366
[45] Mar. 14, 1978

[54] LATERAL MOVEMENT OF SIDE DELIVERY RAKE

[76] Inventor: Elmo Carmichael, Plainville, Rooks County, Kans. 67663

[21] Appl. No.: 682,666

[22] Filed: May 3, 1976

[51] Int. Cl.² .......................................... A01D 43/02
[52] U.S. Cl. ...................................... 56/377; 56/192; 56/DIG. 2
[58] Field of Search .............. 56/377, 1, DIG. 2, 218, 56/228, 370, 192

[56] References Cited

U.S. PATENT DOCUMENTS

| | | | |
|---|---|---|---|
| 2,316,397 | 4/1943 | Briscoe | 56/228 X |
| 2,928,226 | 3/1960 | van der Lely et al. | 56/377 X |
| 2,968,142 | 1/1961 | van der Lely et al. | 56/377 |
| 3,079,742 | 3/1963 | Balzer | 56/192 X |
| 3,868,811 | 3/1975 | Cicci et al. | 56/1 |

FOREIGN PATENT DOCUMENTS 107,163  12/1963  Netherlands ........................... 56/377

*Primary Examiner*—Jay N. Eskovitz
*Attorney, Agent, or Firm*—Holman & Stern

[57] ABSTRACT

The combination of a tractor, a swather of the type including a center rear discharge towed behind the tractor and a side delivery rake towed behind the swather. First towing structure is utilized to couple the side delivery rake to the swather for towing therebehind and second towing structure is utilized to towingly couple the swather behind the tractor. The first and second towing structures are operative to inversely laterally shift the side delivery rake relative to the swather and the swather relative to the prime mover. In this manner, movement of the combination along parallel side-by-side paths, while moving in opposite directions, may result in windrowing of the cuttings made by the swather in a single windrow and it is therefore possible for a baler or other pick-up device to pick up the cuttings of the swather as a result of the pick-up or baling structure making only one-half the number of passes made by the swather and the baler is capable of forming tighter and heavier bales.

6 Claims, 4 Drawing Figures

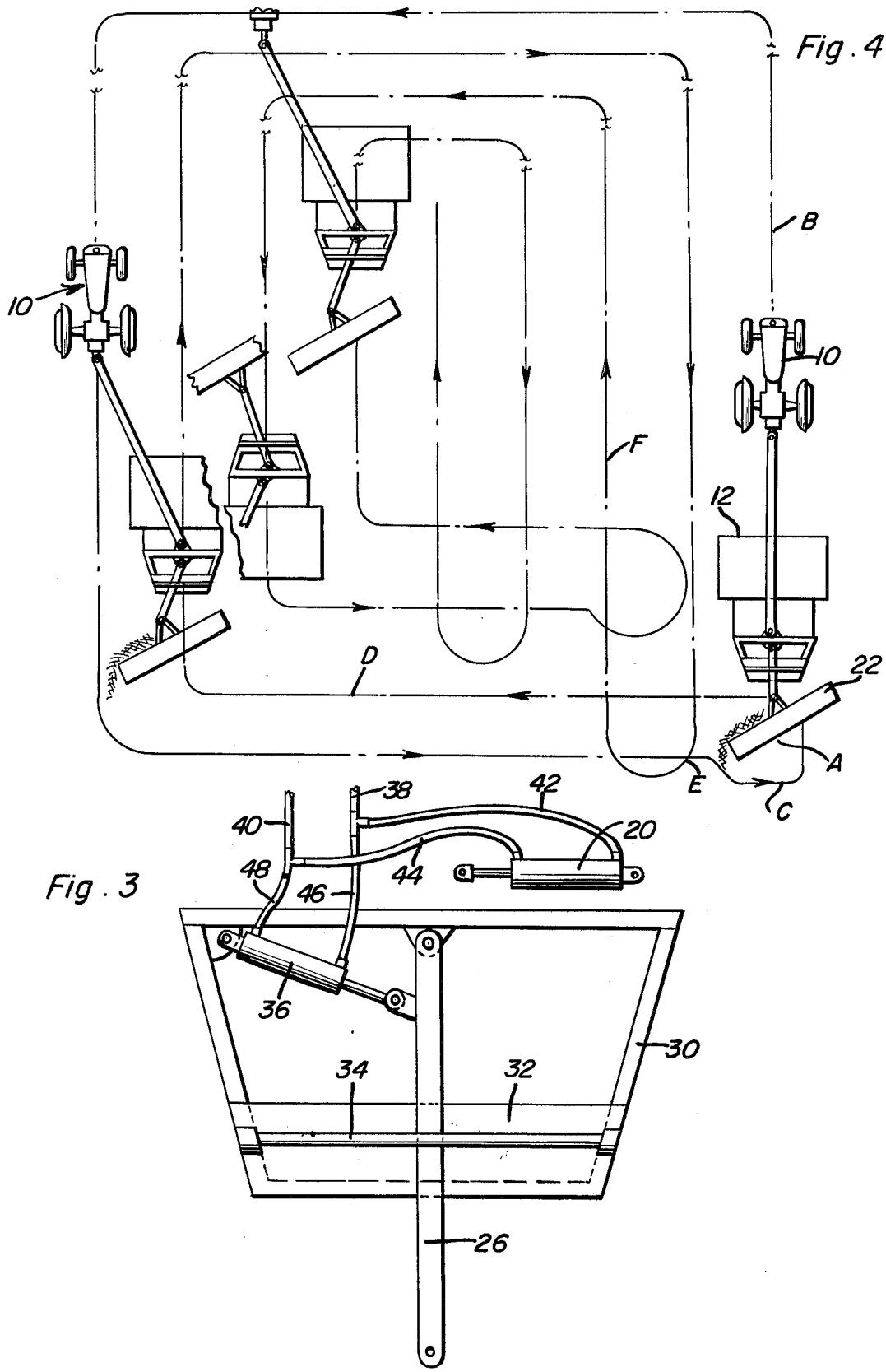

LATERAL MOVEMENT OF SIDE DELIVERY RAKE

BACKGROUND OF THE INVENTION

Swing swathers are used to cut all types of hay crops and to discharge the cut hay into a center windrow. Thereafter, the normal procedure is to bale the cut hay. However, in order to establish sufficient concentration of hay to enable heavy and uniform bales to be formed, it is conventional to follow-up the swather with a side delivery rake in order to move one windrow of hay into another before starting the baling operation. The use of a side delivery rake usually requires an additional tractor to pull the side delivery rake over the cut field in order to rake every other windrow of hay into an adjacent windrow.

The instant invention utilizes a swather provided with a swingable tow beam as well as a rearwardly projecting and swingable tow bar mounted on the rear of the swather to which the tongue portion of a side delivery rake may be coupled for towing behind the swather.

Various prior patents disclose swathers including swing beams and side delivery rakes including swing arms.

BRIEF DESCRIPTION OF THE INVENTION

The main object of this invention is to provide a structure whereby a swather may be utilized to cut hay and have a side delivery rake operatively associated with the swather in a manner whereby the side delivery rake will automatically laterally rake each windrow made by the swather to a position into which the next windrow made by the swather, while moving in the opposite direction, may be raked.

Another object of this invention is to provide a swing-type side delivery rake for use in conjunction with a swing swather and with the controls for the swing swather operatively connected to the controls for the swing-type rake in a manner whereby the rake will be swung inversely relative to the swinging movement of the swather.

A still further object of this invention is to provide an assemblage comprising a swing-type side delivery rake for use in conjunction with a self-propelled swather.

Yet another object of this invention is to provide an assemblage in accordance with the preceding objects and which will conform to conventional forms of manufacture, be of simple construction and easy to use so as to provide a device that will be economically feasible, long lasting and relatively trouble free in operation.

Briefly stated, in accordance with the aforesaid objects, the instant invention includes a swather of the central discharge type and a side delivery rake which is towed behind the swather by towing structure for laterally shifting the rake relative to the swather. If the swather is of the self-propelled type, the shifting of the side delivery rake from one side of the swather to the other is controlled by suitable controls mounted on the swather. However, if the swather is of the type to be towed behind a tractor, a swather of the swing type is provided and the hydraulic circuit for effecting swinging of the swather relative to the tractor is operatively connected to the hydraulic controls for laterally shifting the side delivery rake inversely relative to shifting of the swather relative to the tractor.

BRIEF DESCRIPTION OF THE DRAWINGS

The invention will be better understood from the following description considered together with the accompanying drawings, in which:

FIG. 3 is a schematic top plan view of the swing tow bar for the side delivery rake mounted on the rear of the swather; and FIG. 4 is a schematic view illustrating the manner in which the concepts of the instant invention may be utilized to cut a field with the windrows from the swather raked into double windrows.

DETAILED DESCRIPTION OF THE INVENTION

Figure 1:
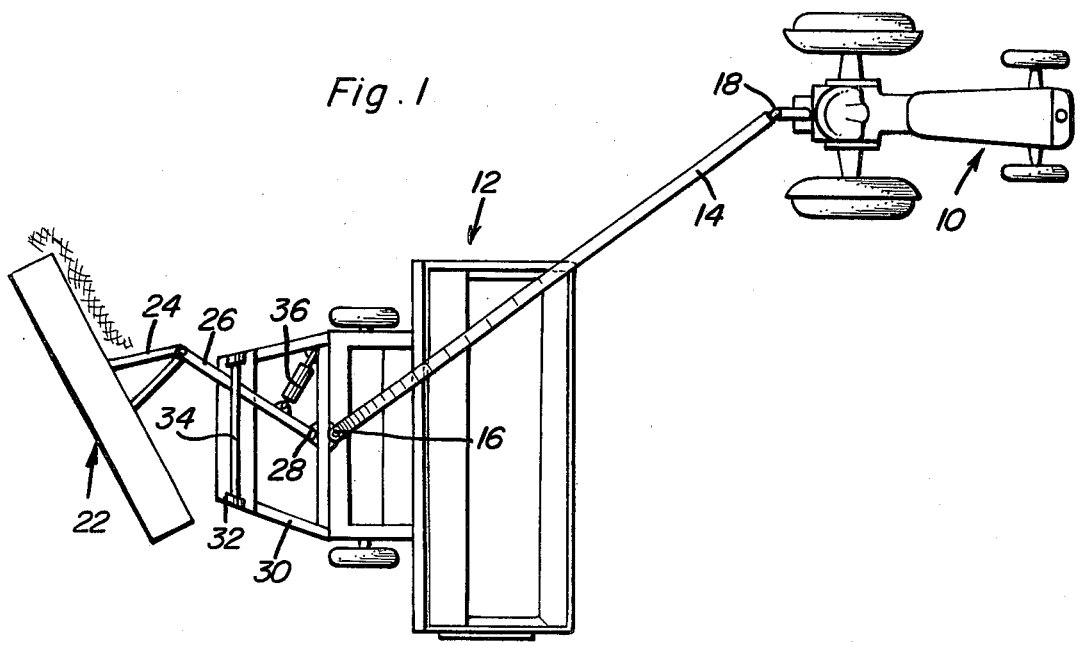
FIGS. 1 and 2 are top plan views of the instant invention with the swing swather and side delivery rake illustrated in inversely laterally shifted positions.

Referring now more specifically to the drawings, the numeral 10 generally designates a tractor to which a swather referred to in general by the reference numeral 12 is coupled. A swing beam 14 is pivotally supported from the swather 12 at the rear end of the beam as at 16 and the front end of the beam 14 is coupled to the tractor 10 as at 18. A hydraulic motor in the form of a double acting cylinder 20 (see FIG. 3) is operatively connected between the swather 12 and the beam 14 for swinging the latter between the limit positions thereof illustrated in FIGS. 1 and 2. The swather 12 is of conventional design and may be of the self-propelled type.

The numeral 22 generally designates a conventional form of side delivery rake including a forward towing tongue portion 24. It may be seen that the forward end of the towing tongue portion 24 is removably pivotally coupled to the rear end of a horizontally swingable tow bar 26 pivotally anchored to the swather 12 as at 28.

A rearwardly projecting trapezoidal frame 30 is mounted on the rear of the swather 12. The frame 20 includes a rear transverse horizontal bearing plate 32 over which a rod 34 extends. The rod 34 has its opposite ends secured to the bearing plate 32 and is spaced slightly above the plate 32. The intermediate portion of the tow bar 26 has its undersurface disposed in sliding contacting relation with the upper surface of the bearing plate 32 and the tow bar 26 is slidingly received beneath the rod 34.

Figure 2:
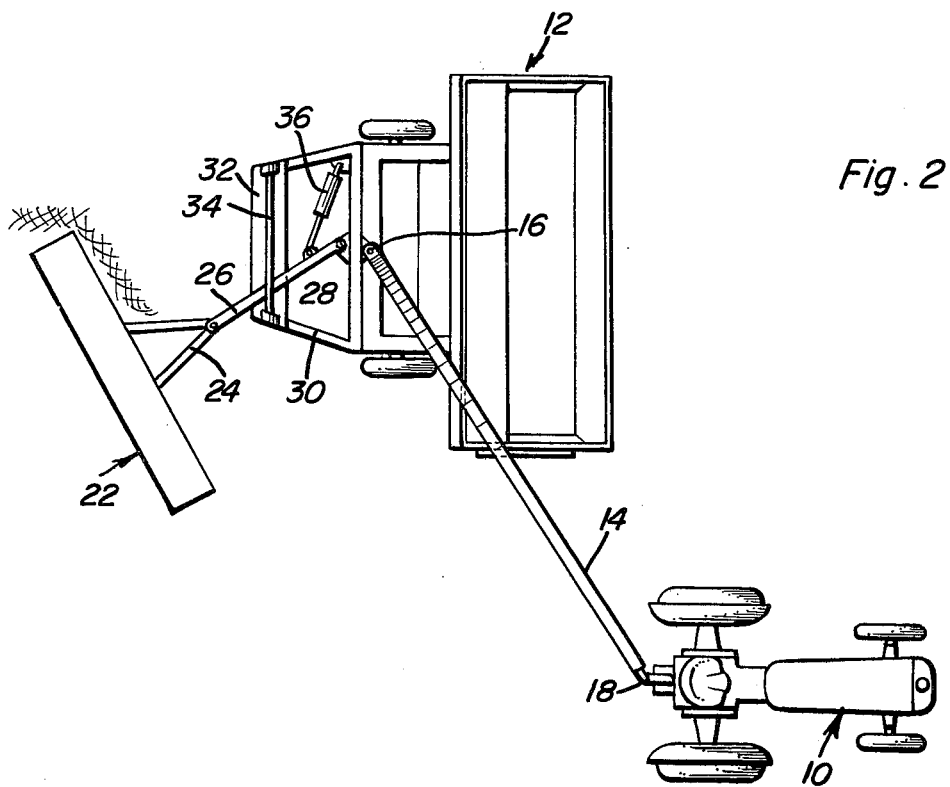

A second reversible motor in the form of a double-acting hydraulic cylinder 36 is pivotally connected between the frame 30 and the tope bar 26 and is therefore operative to swing the tow bar 26 between its limit positions of movement illustrated in FIGS. 1 and 2.

A pair of hydraulic lines 38 and 40 are connected to opposite ends of the cylinders 20 and 36 by connecting lines 42, 44, 46 and 48. It may be seen that if hydraulic fluid is pumped through the line 38 and returned through the line 40 the cylinder 20 will be extended and the cylinder 36 will be retracted. On the other hand, if hydraulic fluid under pressure is supplied through the line 40 and returned through the line 38 the cylinder 20 will be retracted and the cylinder 36 will be extended.

When the cylinder 36 is retracted and the cylinder 20 is extended the beam 14 and tow bar 26 are disposed in the positions thereof illustrated in FIG. 1. However, when the cylinder 36 is extended and the cylinder 20 is retracted the beam 14 and tow bar 26 are in the positions thereof illustrated in FIG. 2.

With attention now invited more specifically to FIG. 4, the tractor 10, swather 12 and rake 22 may enter the field at (A) along one marginal side thereof and orbit the field along the path (B) with the swather 12 positioned in substantial alignment with the tractor 10 and the side delivery rake 22 positioned in substantial alignment with the swather 12. However, when the perimeter of the field has been completed a loop (C) is made and the path (D) is followed about the field in the opposite direction. When the path (D) has been completed a further loop (E) is made and the path (F) is followed about the field.

With the path (B) is followed the central windrow discharge of hay from the swather 12 is raked toward the inside of the field and when the path (D) is followed the central windrow discharge from the swather 12 is raked to the outside of the field whereby the two windrows from the paths (B) and (D) are raked into a single windrow. Further, as the path (D) is being followed the tractor 10 proceeds in the path of the last cut made by the swather. Likewise, when the path (F) is followed the tractor 10 follows the cut made by the swather during its movement along path (D). In this manner the entire field may be cut and windrowed.

As is conventional, the controls for the hydraulic lines 38 and 40 are mounted on the tractor 10. However, operation of those controls to extend and retract the cylinder 20 cause the cylinder 36 to also retract and extend. If, however, the swather 12 is of the self-propelled type, the controls for the hydraulic circuit including the lines 38 and 40 and the cylinder 36 will be mounted on the swather. Of course, in this latter instance the cylinder 20 is not needed.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

What I claim is:

1. In combination, a swather of the type including a center rear discharge, a side delivery rake disposed behind said swather, first tow structure coupling said rake to said swather for towing therebehind, said first tow structure including first shift means operative to selectively laterally shift said rake relative to said swather, a prime mover disposed forward of said swather, second tow structure coupling said swather to said prime mover for towing therebehind, said second tow structure including second shift means operative to laterally shift said swather relative to said prime mover in a direction laterally opposite to the direction in which said rake is shifted relative to said swather, said second shift means being operatively associated with said first shift means to act simultaneously.

2. The combination of claim 1 wherein said first shift means comprises a double acting fluid cylinder, said first tow structure includes a bar pivotally supported at its front and rear end portions from said swather and said rake, respectively, said cylinder having one end connected to said swather and the other end connected to said bar.

3. The combination of claim 2 wherein said swather includes a pair of rear transverse upper and lower guide members supported therefrom, said bar, intermediate its front and rear ends, being guidingly received between said guide members.

4. In combination with a swather of the type including a center rear discharge and a forwardly extending tow beam oscillatably supported at its rear end from said swather for swinging of the forward end of said beam between limit positions disposed outwardly of opposite sides of the swather and with reversible first motor means connected between said beam and swather for swinging said beam between said limit positions, a side delivery rake including a forwardly directed tongue, a rearwardly projecting tow bar pivotally supported at its forward end from the rear of said swather and at its rear end from said tongue for swinging of the rear end of said bar between limit positions disposed on opposite sides of the center line of said swather, reversible second motor means connected between said bar and said swather for swinging said bar between its limit positions and motor actuating means operatively connected to each said motor means for simultaneous operation thereof to universely swing said beam and bar toward opposite sides of said swather.

5. The combination of claim 4 wherein said first and second motor means includes double acting fluid cylinders.

6. The method of cutting and windrowing a field crop utilizing a center rear discharge swather towed behind a prime mover and a side discharge rake towed behind said swather, said swather and rake being laterally shiftable relative to said prime mover and swather respectively, said method including making a first pass over the field to be cut with the swather displaced laterally in one direction relative to the prime mover and the rake displaced laterally in the other direction relative to said swather, said swather cutting a first swath in said field, and thereafter making a second pass over the field in a direction opposite the direction of said first pass with the swather cutting a swath immediately alongside said first swath, said prime mover proceeding in the path of said first swath and the swather and rake oppositely laterally displaced relative to the prime mover and the swather respectively.

* * * * *